March 17, 1970   J. G. BAND   3,500,689
PIPETTE CONSTRUCTION
Filed March 18, 1968
FIG. 1
FIG. 2
FIG. 3
FIG. 4
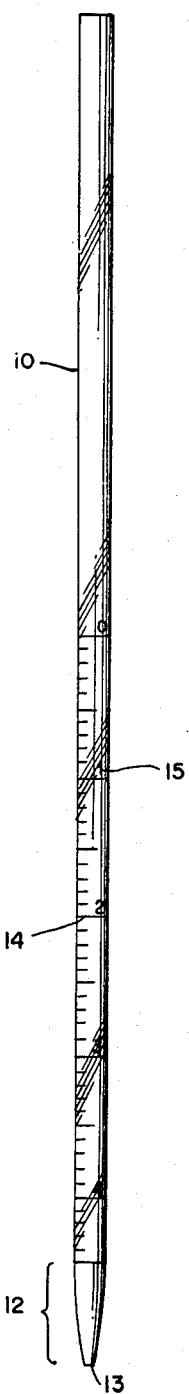
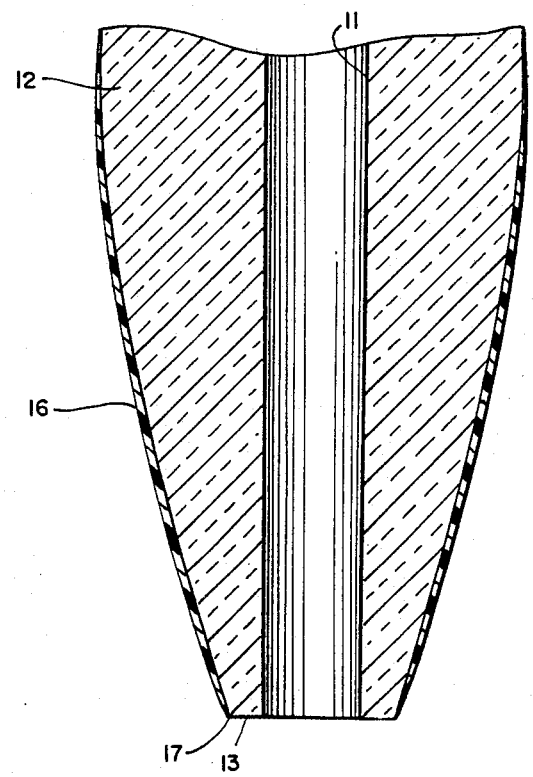
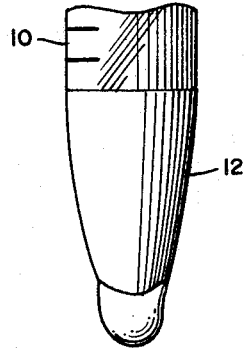
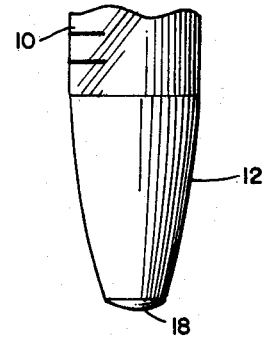
INVENTOR:
JOHN G. BAND
BY
Dawson, Tilton, Fallon, & Lungmus
ATT'YS United States Patent Office 3,500,689
Patented Mar. 17, 1970

3,500,689
PIPETTE CONSTRUCTION
John G. Band, North Miami Beach, Fla., assignor, by mesne assignments, to American Hospital Supply Corporation, Evanston, Ill., a corporation of Illinois
Filed Mar. 18, 1968, Ser. No. 713,871
Int. Cl. G01n 1/10; G01f 13/00
U.S. Cl. 73—425.4
8 Claims

ABSTRACT OF THE DISCLOSURE

A transparent glass tube to be used as a wiping pipette has an axial bore extending therethrough and a tapered portion at one end of the tube terminating in an exposed annular end surface with the end surface being substantially normal to the axis of the bore. A smooth coating of polyfluorohydrocarbon resin with the characteristics of low frictional coefficient and high chemical resistance completely covers the side surface of the tapered end portion. The coating terminates along an edge defined by the outer limits of the annular end surface of the pipette.

BACKGROUND

Proper laboratory technique in the use of pipettes for measuring blood, reagents, or other fluids calls for the step of wiping off the outside of the tip of a pipette with gauze or some other absorbent material after the fluid has been drawn into the pipette and before such fluid is discharged into a suitable container. The wiping step is particularly important with a rinsing pipette, that is, a pipette which is calibrated "to contain" and which requires subsequent rinsing with the diluting fluid, because the outer surface of the tip must necessarily be immersed in such diluting fluid during the rinsing operation. Even with careful wiping, small amounts of test fluid may cling to the tip's outer surface and, when washed off by the diluent during the rinsing operation, may appreciably affect the accuracy of the measurement. Obviously, the extent of error has an inverse bearing on the capacity of the pipette and the amount of fluid to be measured; it is significant that the percenage of error tends to be greater in procedures involving the use of relatively small serological pipettes where even a slight error might lead to incorrect diagnosis and treatment.

SUMMARY

An important aspect of the invention lies in the recognition that the possibilities of error which have heretofore existed in the use of pipettes because of trace amounts of fluid which may cling to the outer surface of a pipette tip after a wiping operation may be eliminated or greatly reduced if the tip portion of the pipette has a polyfluorohydrocarbon coating. A coating formed of polyfluorohydrocarbon resin, such as polytetrafluoroethylene or fluorinated ethylene propylene (available as Teflon fluorocarbon resins) provides a surface having an extremely low coefficient of friction. The slippery, non-adhesive surface is readily wiped free of traces of the liquid drawn into such a pipette so that during a subsequent rinsing operation the only liquid mixed with the diluent is the liquid previously measured by the pipette. Only the tapered side surface of the pipette is so coated; an important feature of the invention lies in the fact that the extreme end surface of the pipette tip is free of such coating. As a result, the end surface with its greater coefficient of friction is capable of retaining a small drop of fluid following a wiping operation and the danger that some fluid might be extracted from the bore of the pipette during the wiping step is avoided.

DRAWINGS

FIGURE 1 is a side elevational view of a serological pipette embodying the present invention;
FIGURE 2 is an enlarged longitudinal sectional view of the tip portion of the pipette;
FIGURE 3 is a fragmentary elevational view of the tip portion of the pipette following a filling step but prior to a wiping step;
FIGURE 4 is a fragmentary elevational view similar to FIGURE 3 but illustrating the tip portion of the pipette following a wiping step and before a rinsing operation.

DESCRIPTION

Referring to the drawings, the numeral 10 generally designates a pipette in the form of a straight, elongated, transparent glass tube. A bore 11 extends axially through the tube and the lower end of the tube is gradually reduced in outside diameter to provide a tapered tip portion 12. In the illustration given, bore 11 is of the same diameter throughout its longitudinal extent; however, if the capacity of the pipette is relatively large then it may be desirable to reduce the diameter of the bore at the lower end thereof to reduce the rate of flow when the pipette is drained.

The tapered end portion 12 of the pipette terminates in an annular end surface 13 which extends substantially normal to the axis of the pipette and which surrounds the opening at the lower end of the bore. Graduation markings 14 may be provided on the outer surface of the pipette extending upwardly from the tip end thereof and numerical indicia 15 may be located adjacent the graduation markings, all as well understood in the art. The structure so far described is entirely conventional and, accordingly, a more detailed description, except for those features which constitute the improvement of the present invention, is believed unnecessary herein.

A distinctive feature of pipette 10 is that the side surface of its tip portion 12 is coated with polyfluorohydrocarbon resin such as polytetrafluoroethylene or fluorinated ethylene propylene. Polytetrafluoroethylene and fluorinated ethylene propylene resins are marketed by E. I. du Pont de Nemours & Co., Wilmington, Del., under the trademark "Teflon," and are characterized by having a low coefficient of friction and a high degree of resistance to chemical attack over a wide range of temperatures. While Teflon has been found highly effective as the coating material, it will be understood that other polyfluorohydrocarbon resins having similar properties may be used such as, for example, polyvinylidene fluoride, copolymers of vinylidene fluoride and hexafluoropropylene, polytrifluorochloroethylene, and copolymers of vinylidene fluoride and trifluorochloroethylene. All of such fluoropolymers are commercially available and are known for their properties of low surface energy which makes their surfaces non-adhesive and slippery, and of general chemical inertness over a wide range of tempertaures.

The fluorocarbon coating 16 may be applied to the tip portion of the pipette by spraying, dipping, or any suitable means. Following application of the resin in its commercially-available form as an aqueous dispersion, the coating is dried and heated to a temperature within the range of 350 to 800 degrees F. to bake and fuse the resin and produce the finished coating 16, such treatment steps all being well known in the art. The result is a smooth continuous coating of low surface energy over the entire side surface of the tapered tip portion 12.

Coating 16 is preferably opaque to assist in the detection by visual inspection of any residuum of fluid on the outer surface which might otherwise escape observation if the tip were clear. The axial length of the coated portion of the pipette falls within the range of approximately one fourth to three fourths of an inch, depending primarily upon the size of the pipette. The thickness of the coating or film may vary over a wide range but, in general, should be less than 0.01 of an inch.

It is to be noted that the end surface 13 of the pipette remains uncoated, the fluorocarbon coating 16 terminating along an edge 17 which defines the outer limits of the annular end surface of the tip. Thus, while the glass of the tip is generally concealed or covered by coating 16, the glass at the extreme end surface of the tip about bore 11 is exposed.

In the use of pipette 10, a technician first draws fluid to be measured into the pipette to a point slightly above the selected etched line, normally the zero line indicated in FIGURE 1. Then, while holding his index finger over the top of the pipette to retain the fluid within bore 11, the user wipes off the tip portion 12 of the pipette with a downward stroke using gauze or some other absorbent material. The condition of the pipette prior to the wiping step is illustrated in FIGURE 3, and its condition following the wiping operation is shown in FIGURE 4. As represented in FIGURE 4, the side surface of the coated tip portion 12 of the pipette is completely free of fluid. A small drop 18, or fractional drop, of fluid projects downwardly from the undersurface 13 of the pipette tip.

After the pipette tip has been wiped, the user rotates the pipette between his thumb and second finger, thereby allowing a small amount of air to enter beneath the index finger until the fluid level is brought down to the desired point. In normal procedures, the desired level is reached when the meniscus is located precisely at the zero line (the top graduation) illustrated in FIGURE 1. Again the tip of the pipette will assume the appearance as illustrated in FIGURE 4 with a small drop, or fraction of a drop, barely visible at the pipette's lower end. The tip of the pipette is then introduced into the neck of the container into which the fluid is to be placed and the contents of the pipette are allowed to flow into the container. Where a rinsing pipette is used, the tip is immersed in the diluting fluid into which the sample is discharged and the diluting fluid is thereafter drawn upwardly into the bore of the pipette and expelled therefrom to rinse away any residual sample fluid in the bore.

From the foregoing, it is believed apparent that the coating 16 upon the tip of the pipette not only simplifies the job of wiping the pipette but also contributes significantly to an increase in accuracy in the use of such a pipette. Furthermore, the elimination of small amounts of fluid which might otherwise remain on the sides of a pipette tip (in the absence of such a coating) following a wiping operation is achieved without also drawing fluid from the bore since, as described above, the end surface of the pipette is uncoated to permit the formation of a small bulge or partial drop of fluid of controlled and uniform size as indicated in FIGURE 4. Since the plastic coating commences sharply at the outer limits of annular surface 13 and extends upwardly along the side of the pipette tip, there is no danger that the fluid in the pipette, after the wiping step, will creep or expand laterally upwardly about the circular edge of the tip.

While in the foregoing I have disclosed an embodiment of the invention in considerable detail for purposes of illustration, it will be understood by those skilled in the art that many of these details may be varied without departing from the spirit and scope of the invention.

What is claimed is:

1. A wiping pipette in the form of a transparent glass tube having an axial bore extending therethrough and having a tapered portion at one end thereof terminating in an exposed annular end surface substantially normal to the axis of said tube, wherein the improvement comprises a smooth coating of polyfluorohydrocarbon resin having the characteristics of low frictional coefficient and high chemical resistance and completely covering the side surface of the tapered end portion of said pipette, said annular end surface and said bore being free of said coating.

2. The structure of claim 1 in which said coating extends axially along the side surface of said end portion a distance within the range of approximately one fourth to three fourths of an inch measured from the extreme end of said pipette.

3. The structure of claim 1 in which said coating is opaque.

4. A wiping pipette in the form of a transparent glass tube having an axial bore extending therethrough and having a tapered portion at one end thereof terminating in an exposed annular end surface substantially normal to the axis of said bore, wherein the improvement comprises a smooth coating of polyfluorohydrocarbon resin having the characteristics of low frictional coefficient and high chemical resistance and completely covering the side surface of the tapered end portion of said pipette, said coating terminating along an edge defining the outer limits of said annular end surface.

5. The structure of claim 4 in which said coating extends axially from said edge and along said pipette a distance within the range of approximately one fourth to three fourths of an inch.

6. The structure of claim 5 in which said coating's outer surface is substantially flush with the exposed outer glass surface of said pipette at the end of said coating opposite from said edge.

7. The structure of claim 4 in which said coating is opaque.

8. The structure of claim 4 in which the surface defining said bore is free of said coating.

References Cited

UNITED STATES PATENTS

| 1,634,183 | 6/1927 | Gervais et al. | |
| 2,083,228 | 6/1937 | Geyer | 23—292 |
| 2,726,549 | 12/1955 | Geffen. | |

OTHER REFERENCES

Laboratory Supply News, Laboratory Supplies Co., Inc., prior to April, 1967, p. 13.

LOUIS R. PRINCE, Primary Examiner

H. C. POST, III, Assistant Examiner